US007610677B2

(12) United States Patent
Lorenz et al.

(10) Patent No.: US 7,610,677 B2
(45) Date of Patent: Nov. 3, 2009

(54) METHOD FOR MANUFACTURING A THROTTLE VALVE UNIT

(75) Inventors: Christian Lorenz, Aalen-Unterrombach (DE); Roland Zoelch, Jihlava (CZ); Frank Schonder, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 677 days.

(21) Appl. No.: 11/217,476

(22) Filed: Sep. 2, 2005

(65) Prior Publication Data

US 2006/0048388 A1 Mar. 9, 2006

(30) Foreign Application Priority Data

Sep. 6, 2004 (DE) ....................... 10 2004 043 427

(51) Int. Cl.
*B21K 1/22* (2006.01)
*B21K 1/20* (2006.01)
*B29C 45/14* (2006.01)

(52) U.S. Cl. ................ 29/888.4; 29/888.46; 29/888.45; 29/527.1; 264/242; 264/255

(58) Field of Classification Search ................ 29/888.4, 29/888.45, 888.46, 527.1; 264/255, 242, 264/254, 267
See application file for complete search history.

(56) References Cited

U.S. PATENT DOCUMENTS 4,740,347 A * 4/1988 Sloan et al. ................. 264/262
5,304,336 A 4/1994 Karlsson et al.
6,491,020 B2 * 12/2002 Kotchi et al. ................ 123/337
6,923,157 B2 * 8/2005 Torii et al. .................. 123/399
2006/0138697 A1 * 6/2006 Lorenz et al. ............... 264/242

FOREIGN PATENT DOCUMENTS

EP 0482272 B1 6/1995

* cited by examiner

*Primary Examiner*—David P Bryant
*Assistant Examiner*—Sarang Afzali
(74) *Attorney, Agent, or Firm*—Ronald E. Greigg

(57) ABSTRACT

A method for optimizing the friction, wear, and function of an injection-molded throttle valve unit, including a throttle valve housing and a throttle valve that can move in relation to it. The throttle valve housing is injection molded out of a first plastic material inside a first cavity, then transferred to a second cavity. Bearing bushes are inserted into the throttle valve housing to constitute a hard material on hard material friction pairing between the bearing bushes and the throttle valve housing; either the bearing bushes are inserted into the throttle valve housing in a non-rotating fashion and the valve shaft rotates in relation to the bearing bushes or the bearing bushes rotate in relation to the throttle valve housing. The moving throttle valve is injection molded from a second plastic material inside the second cavity. The bearing bushes are preferably manufactured out of a metallic material and remain dimensionally stable when subjected to the injection pressure.

14 Claims, 4 Drawing Sheets

METHOD FOR MANUFACTURING A THROTTLE VALVE UNIT

CROSS-REFERENCE TO RELATED APPLICATIONS

This application is based on German Patent Application 10 2004 043 427.1 filed Sep. 6, 2004, upon which priority is claimed.

BACKGROUND OF THE INVENTION

1. Field of the Invention

In the automotive field, throttle valve units are increasingly produced in large batches in the form of plastic injection molded components. For example, such throttle valve units are valves injection molded into the valve housing together with the injection molding process that produces the housing. The throttle valve units that are used in the automotive field are subjected to temperatures between −40° C. and 140° C. so that care must be taken to assure the operational reliability of the formed parts in this temperature range, specifically with regard to gap widths that can be achieved in the injection molding process.

2. Description of the Prior Art

EP 0 482 272 B1 relates to a valve unit, disclosing a valve device and a method for manufacturing a moving valve in a housing that accommodates the moving valve. The valve and the valve housing can be manufactured in one and the same die. The housing is manufactured in a first injection molding step and the disk-shaped valve part is formed into it in a second injection molding step. On the valve part that moves in relation to the housing, sealing sections are provided, which cooperate in a sealing fashion with housing regions of the valve housing. The valve part is preferably of the butterfly type and the valve housing is preferably of the type designed to accommodate a butterfly type valve. The disclosed manufacturing method is capable of significantly reducing the production cost of a valve device for the automotive field. In this embodiment variant, the valve and its housing are positioned transversely in relation to the air flow direction.

U.S. Pat. No. 5,304,336 likewise relates to a method for manufacturing a throttle device. The device contains a moving part and a housing for accommodating the moving part. The moving part and the housing are produced through sequential manufacturing steps of the injection molding process. Preferably, the housing is injection molded in a first process step whereas the part that moves in relation to the housing is produced in another manufacturing step, this moving part being situated in an at least partially closed position. According to the disclosed manufacturing method, a surface of the housing serves as at least a portion of the mold for forming a sealing portion of the movable valve part, thus achieving a very close tolerance between the housing and the valve part that moves in relation to it. According to U.S. Pat. No. 5,304,336 as well, the valve part that moves in relation to the housing is embodied as butterfly-shaped. The housing is preferably of the type that accommodates a butterfly type valve.

The manufacturing methods known from EP 0 482 272 B1 and U.S. Pat. No. 5,304,336 for producing an air-guiding part by means of an injection molding process have the disadvantage that these methods can produce formed parts that may be insufficient in their operational reliability. This is essentially due to an insufficient adjustability and reproduction precision of required gap widths in the shaft bearings and in the gas passage bore in devices manufactured in this way. The methods described above do not offer the necessary capacity for deliberately influencing the gap width by means of machine setting parameters in the forming, i.e. during the injection molding process, in order to achieve a definite air leakage quantity in the closed position of the valve. From one production cycle to the next, the required gap widths cannot be achieved with a sufficient degree of reproducibility to attain a definite leakage air quantity in the closed position of the valve. It is only permissible for the precision or uniformity of such gaps in valves to vary within a range of a few μm. This is of considerable importance in the automotive field in which such air-guiding parts are subjected to a larger temperature range within temperatures of between −40° C. and 140° C. (engine operation temperature in the cylinder head region). Due to a close interconnection between the temperature of the forming die and the cycle time of the injection molding process according to the above-cited manufacturing methods, the required degree of precision cannot be achieved by means of the cavity provided in the forming die. This is particularly true when, according to the methods in the embodiments described above, partially crystalline or amorphous thermoplastic high temperature plastics are used for the above-indicated temperature range for engine compartment applications. According to the manufacturing methods known from EP 0 482 272 B1 and U.S. Pat. No. 5,304,336, it is not possible to react flexibly enough to process fluctuations, e.g. property fluctuations in the molding compounds during forming, i.e. during the production process that includes the injection molding process. The fluctuations described have an impermissibly powerful influence on the quality of the throttle devices produced.

OBJECT AND SUMMARY OF THE INVENTION

In order to reduce frictional resistances and prevent premature wear at bearing locations between a throttle valve housing and a throttle valve shaft, according to the present invention, bearing bushes are installed on the throttle valve shaft and/or in the throttle housing. The bearing bushes can be inserted in a non-rotating fashion into the previously molded housing part of the throttle unit so that the throttle valve shaft parts injection molded onto the preferably curved valve flap part can rotate in the housing part. Alternatively, it is possible to insert the bearing bushes into the previously molded housing part in such a way that the bearing bushes can rotate in relation to the previously molded housing part and the throttle valve parts of the preferably curved valve flap part are injection molded in a non-rotating fashion into the bearing bushes that have been previously inserted into the wall of the previously molded housing part.

The bearing bushes are preferably comprised of a metallic material or an alloy of metallic materials; preferably, the bearing bush is a deep drawn component. As an alternative to deep drawing, the bearing bush can be manufactured by means of a material-removing production process such as turning. In addition, the bearing bush containing metallic material can also be ground or produced by means of extrusion. Preferably steel is used as the metallic material. A bearing bush made of steel, for example, is distinguished by a very favorable dimensional stability and a high degree of roundness. If a bearing bush produced as outlined above is inserted into a throttle valve housing or attached to the throttle valve shaft, then the selection of a suitable plastic material such as PPS (polyphenylene sulfide) produces a friction state between two hard substances, which runs contrary to bearing theory. According to prior thought, the material combination should be soft on hard, e.g. brass/PPS. But it has surprisingly turned out that contrary to the prevailing bearing theory, the selected material combination, i.e. the throttle valve housing comprised of PPS and the throttle valve shaft ends comprised of PPS, significantly reduces wear in the radial and axial directions, i.e. on the circumferential surface of the bearing bush and the corresponding part in the throttle valve housing.

The bearing bush proposed according to the present invention also includes an axial bearing since one end of the bearing bush serves as an axial stop face. At the end of the bearing bush opposite from the axial contact surface, a shoulder or stop shoulder can be provided, which can extend either inward in relation to the throttle valve shaft or outward in relation to the circumference of the throttle valve shaft.

An even further reduction in wear can be achieved by further improving the surface obtained as part of the forming process through an additional surface hardening process. The wear can also be further reduced if the circumferential surface of the proposed bearing bush has low $R_Z$ values. With high $R_Z$ values, the circumferential surface of the bearing bush would act in a material-removing manner on the plastic, which would result in an excessively high degree of wear in the radial direction as operation time increased. If the geometry of the stop shoulder of the bearing bush is produced, for example, by means of stamping or swaging, then minimal radii of 0.1 mm can be achieved in the injection molding process. A further reduction of the wear both in the radial and axial direction can be achieved by applying a lubricant to the bearing sleeve. On the other hand, even with "dry" operation, the embodiment proposed according to the present invention can achieve a reduction in wear. In this instance, "dry" means operation without the introduction of a lubricant.

Depending on the intended use of the bearing bush proposed according to the present invention, it can be embodied with different axial lengths, depending on where it is to be installed on the throttle valve shaft.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1A:
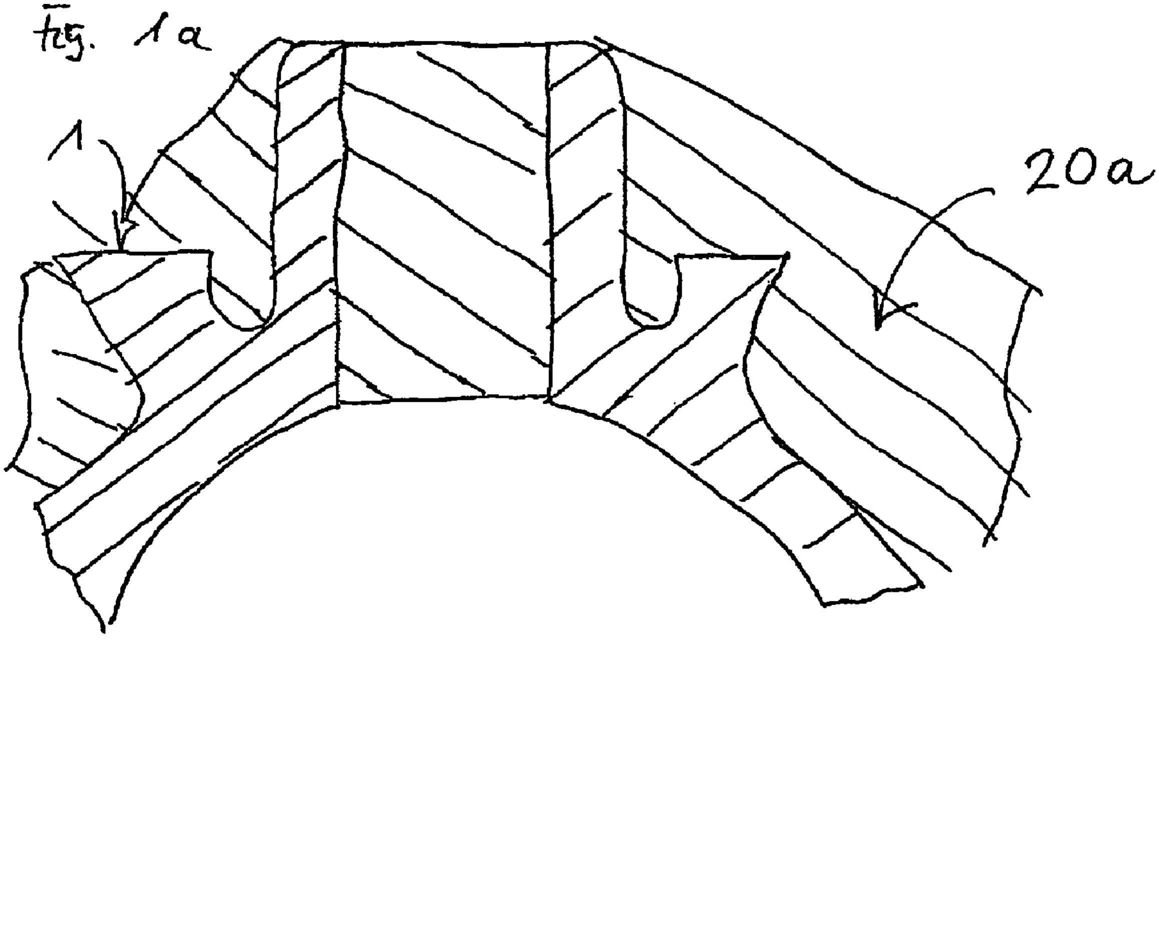
FIG. 1*a* shows the throttle valve housing according to the invention, in a first area.
Figure 1B:
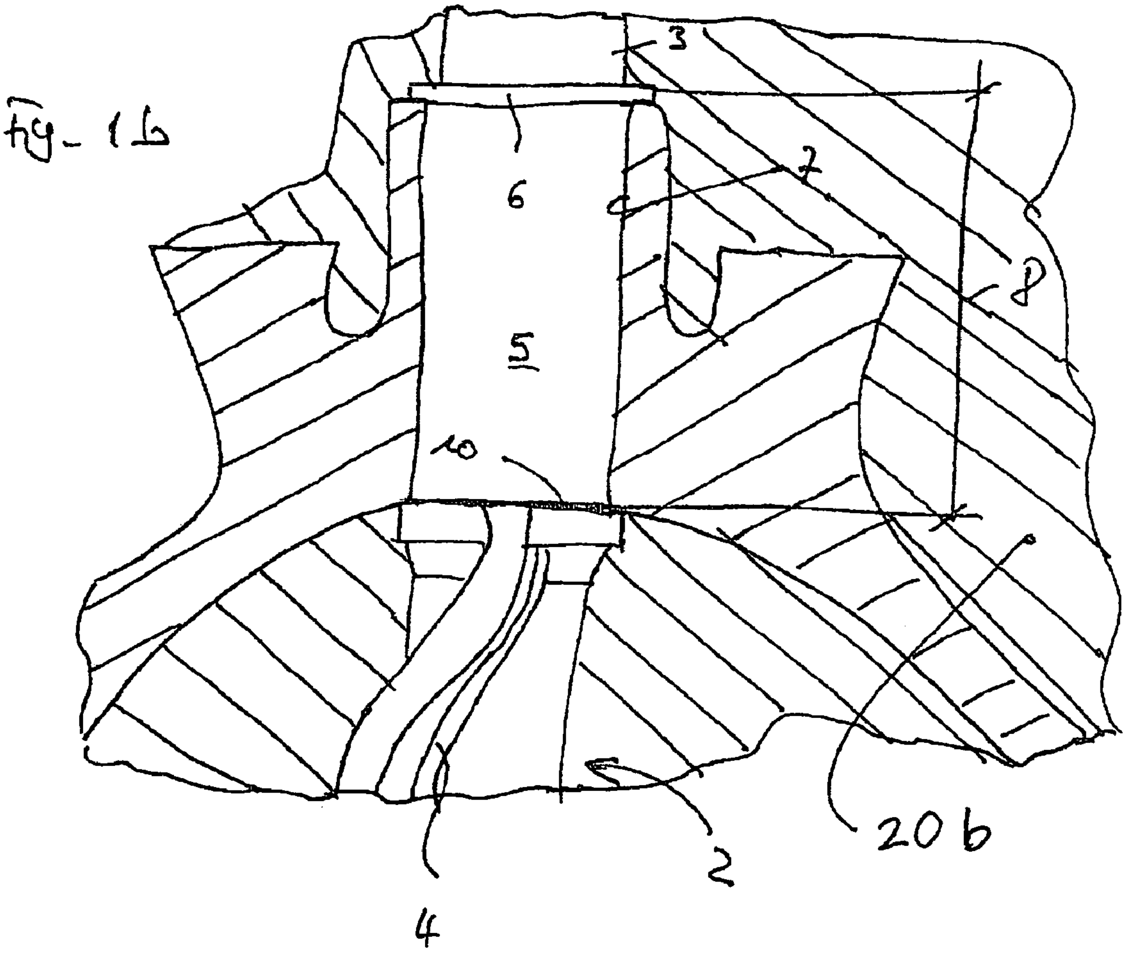
FIG. 1*b* shows a bearing bush, which is accommodated on one end of the throttle valve shaft and is embodied with a first axial length, in second area.

FIG. 1*b* shows a bearing bush 5 that is embodied with a first axial length, is accommodated in a throttle valve housing (FIG. 1*a*), and encompasses a throttle valve shaft. The throttle valve housing is manufactured out of a plastic material such as PPS (polyphenylene sulfide) by means of the injection molding process. The throttle valve housing 1 contains a throttle valve 2 that can rotate around a valve shaft 3. The valve shaft 3 of the throttle valve 2 supports the throttle valve flap 4, which opens or closes a gas passage opening in accordance with the pivoting position of the throttle valve flap 4.

The throttle valve housing 1 accommodates a bearing bush 5 having a shoulder 6 that extends outward in the depiction according to FIG. 1*b*. The reference numeral 7 identifies a circumferential surface of the bearing bush 5, which is embodied with an axial length 8. The circumferential surface 7 of the bearing bush 5 constitutes an axial contact surface 10 of the bearing bush 5 in relation to a collar embodied on the valve shaft 3.

Figure 2:
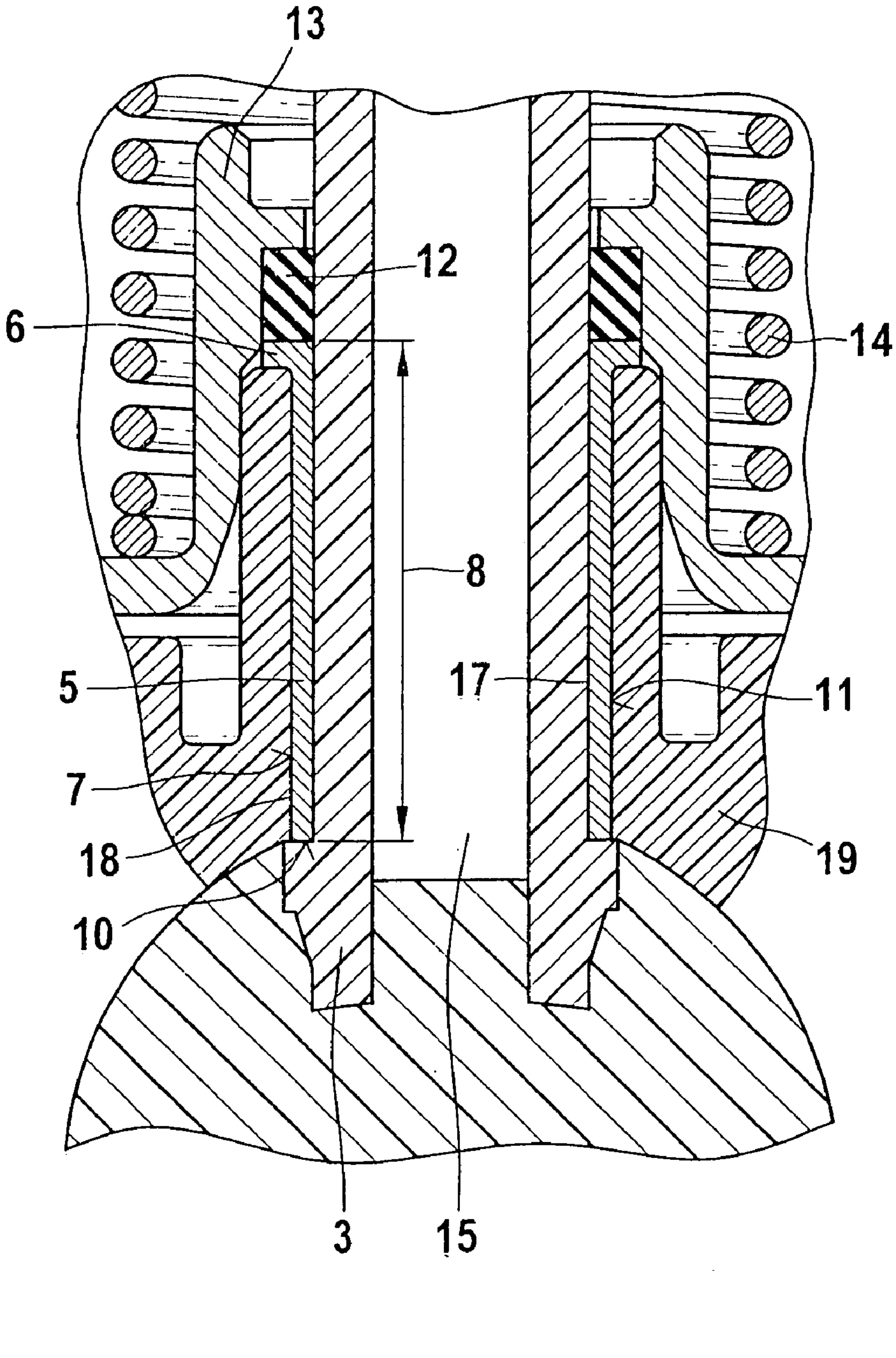
FIG. 2 shows a section through a first throttle valve bearing location in a throttle valve housing.

FIG. 2 shows a section through a first bearing location of a throttle valve shaft in a throttle valve housing. The bearing bush 5, which is embodied with an axial length 8, is mounted onto the circumferential surface of the valve shaft 3. The reference numeral 17 indicates the inside of the bearing bush 5 that rests against the valve shaft 3. The reference numeral 11 indicates a radial contact surface 11 of the bearing bush 5 in relation to a bearing shell 19 of the throttle valve housing 1.

The throttle valve housing 1 and bearing shell 19 of the throttle valve housing 1 are made of a first plastic material inside a first cavity or area 20*a* for making the valve housing as in FIG. 1*a*. After the housing 1 has been made and at least one bearing bush 5 is inserted into the valve housing 1, it is moved to a second cavity or area 20*b* for making the throttle valve 2 and the valve shaft 3 of a second material, as in FIG. 1*b*. In the first cavity of a first device the throttle valve housing is made, and in a second cavity of a second device the flap throttle valve and valve shaft are made within the premade throttle valve housing 1.

The valve shaft 3 is embodied in the form of a hollow shaft and contains a cavity 15 that extends through the valve shaft ends 3 and the throttle valve flap 4 of the throttle valve 2.

The sealing ring 12 rests with one of its shoulders against a stop shoulder 6 of the bearing bush 5. The sealing ring 12 is encompassed by drive unit 13, which in turn rests against a return spring 14. In addition to its rotating action, the return spring 14 can also have an axial force component so that it presses the throttle valve shaft 3 against the bearing bush 5 in the region of the axial contact surface 10. This arrangement serves to transmit the axial clamping force exerted by the return spring 14 to the contact surface 10 of the bearing bush 5 via the valve shaft 3. In addition, this makes it possible to significantly improve the tightness of the seal produced by the throttle valve housing 1.

The bearing bush 5 depicted can either be a deep drawn bearing bush or one that is produced by means of material-removing machining, for example turning. It can also be ground on the circumferential surface 7 or produced by means of the extrusion process. Preferably, the bearing bush 5 is comprised of a metallic material such as steel. A metallic material particularly excels in terms of its roundness due to its dimensional stability. As a result, the shaft ends of the valve shaft 3 in the bearing region are molded in a particularly favorable manner in the bearing bush 5 comprised of metallic material during the injection molding of the plastic material of which the valve shaft 3 and the throttle valve flap 4 formed onto it are composed. The circumferential surface 7 of the bearing bush 5, which represents the radial contact surface 11, is embodied with a low $R_Z$ value. It has turned out that high $R_Z$ values encourage wear since they would cause a metallic surface to act as a file on the plastic surrounding it.

According to the present invention, it has surprisingly turned out that contrary to bearing theory, the radial wear that occurs at the radial contact surface 11 can be significantly reduced with a hard on hard friction setup. In this instance, the friction partners are the circumference surface 7 of the bearing bush 5 comprised of a metallic material and the inside of the bearing shell 19 of the throttle valve housing 1 according to the depiction in FIG. 2. A friction setup in which the involved friction partners constitute a hard/hard friction pairing also occurs at the axial contact surface 10, i.e. the annular end of the bearing bush 5 oriented toward a collar on the throttle valve shaft 3.

Here, too, the embodiment proposed according to the present invention can achieve a significant reduction in the wear occurring in the axial direction. The end of the bearing bush 5 that constitutes the contact surface 10 with a collar on the valve shaft 3 is also machined to a low $R_Z$ value. In addition, there is also a hard/hard friction setup at the axial contact surface 10 since the end of the bearing bush 5 preferably made of metallic material and a collar on the circumference of the valve shaft 3 preferably made of PPS meet each other at the axial contact surface 10.

On the one hand, it is possible for the bearing bush 5, which is made of a metallic material and has a high dimensional stability, to be pressed in a non-rotating fashion into the throttle valve housing 1 or throttle valve housing section 19. If the bearing bush 5 is press-fitted into this component in a non-rotating fashion, then the valve shaft 3 with the throttle valve flap 4 formed onto it rotates inside the bearing bush 5. Alternatively, it is also possible for the bearing bush 5 to be mounted onto the valve shaft 3 in a non-rotating fashion, for example by means of a press fit, and for its circumferential surface 7 to rotate inside the throttle valve housing 1 or throttle valve housing section 19. If the bearing bush 5 is mounted in a non-rotating fashion on the valve shaft 3, then an optimized radial wear occurs at the radial contact surface 11 between the outside of the circumferential surface 7, the bearing bush 5, and the throttle valve housing 1. By contrast, if the bearing bush 5 is injection molded in a non-rotating fashion into the throttle valve housing 1 or throttle valve housing section 19, then an optimized radial wear occurs between the inside of the bearing bush 5 and the seat surface of the valve shaft 3 in the vicinity of the shaft end of the valve shaft 3. In both cases, the axial wear occurring at the axial contact surface 10 is also significantly reduced.

The bearing bush 5 can be press-fitted or injection molded into the throttle valve housing 1 or throttle valve housing section 19. It is also possible according to one of the above-outlined embodiment variants to press the bearing bush 5 onto the shaft stub of the valve shaft 3 embodied in the form of a hollow shaft.

The bearing bush 5 mounted onto the circumferential surface of the valve shaft 3 in the depiction according FIG. 2 is embodied with an axial length 8 since the outwardly extending stop shoulder 6 is embodied so that it rests against the bearing shell 19. The stop shoulder 6 is acted on by a shoulder of the ring 12, which in turn rests against a sleeve 13 that is prestressed by means of the spring element 14. Instead of mounting the bearing bush 5 in a non-rotating fashion onto the circumferential surface of the valve shaft 3, according to the above-outline embodiment variant, it is also easily possible to press the bearing bush 5 in a non-rotating fashion into the throttle valve housing 1 or throttle valve housing section 19 so that the valve shaft 3 rotates inside the bearing bush 5.

Figure 3:
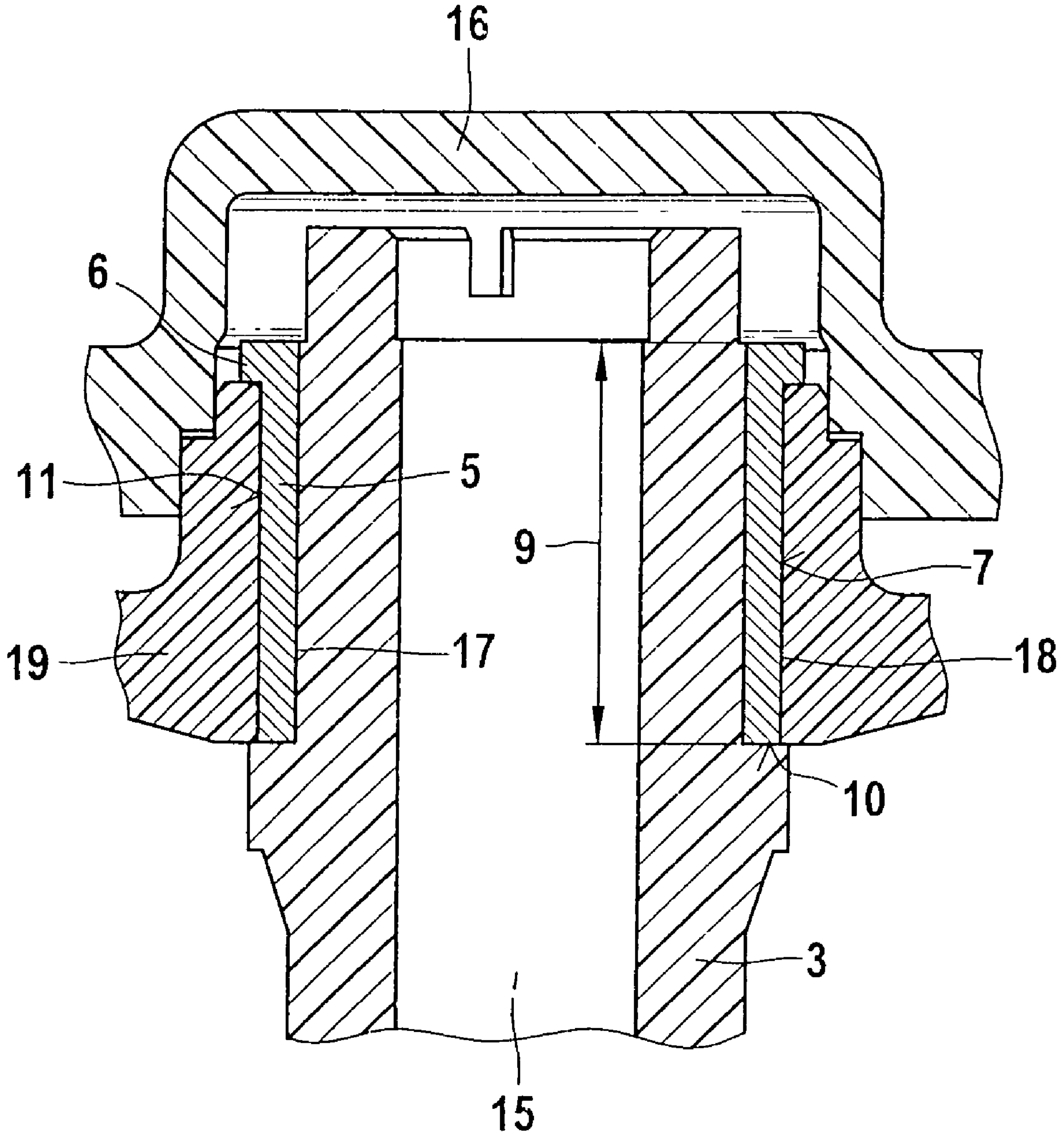
FIG. 3 shows a second throttle valve bearing location for supporting a throttle valve shaft in a throttle valve housing.

FIG. 3 shows another embodiment variant of a bearing bush 5 proposed according to the present invention that is mounted onto a valve shaft 3 of a throttle valve unit. In the depiction according to FIG. 3, a cover 16 of the throttle valve housing 1, not shown, encompasses the end of the valve shaft 3 shown. The bearing bush 5, which is preferably comprised of a metallic material such as steel, is embodied with an axial length 9 which is shorter than the bearing bush 5 in the depiction according to FIG. 2. The bearing bush 5, which is distinguished by a high degree of roundness, has a stop shoulder 6 analogous to the one on the bearing bush 5 depicted in FIG. 2. With the stop shoulder 6, the bearing bush 5 rests against an end of a throttle valve housing section 19. The inside surface 17 of the bearing bush 5 according to the depiction in FIG. 3 is accommodated against a corresponding seat surface of the valve shaft 3. The outer circumferential surface 7 of the bearing bush 5 is labeled with the reference numeral 18 and constitutes the hard/hard friction pairing between the bearing bush 5 and the material of the bearing shell 19. The wear occurring at the radial contact surface 11 is minimized due to the hard/hard friction setup between the outside 18 of the circumference surface 7 of the bearing bush 5 and the material comprising the bearing shell 19. In this case, the bearing bush 5 rotates in relation to the throttle valve housing 1 or throttle valve housing section 19. Alternatively, it is possible for the bearing bush 5, which is preferably made of a metallic material, to be injection molded in a non-rotating fashion into the throttle valve housing 1 or throttle valve housing section 19 and for the valve shaft 3 to rotate in relation to the non-rotating bearing bush 5. In this instance, there is a hard/hard friction pairing between the seat surface of the valve shaft 3 and the inside of the bearing bush 5 made of metallic material.

At the annular end of the bearing bush 5, i.e. at the axial contact surface 10, there is also a hard/hard friction setup. At this location, the bearing bush 5 preferably made of metallic material contacts a collar provided on the circumferential surface of the valve shaft 3. Since the bearing bush 5 is made of a metallic material and a plastic such as PPS is used as the material for the valve shaft 3 with the valve flap 4 molded onto it, the above-mentioned hard/hard friction setup is present at the axial contact surface 10.

In the bearing device shown in FIG. 3 as well, a hard/hard friction setup significantly reduces the radial wear occurring at the radial contact surface 11 between the circumferential surface 7 of the bearing bush 5 and the inside of the bearing shell 19, which runs contrary to bearing theory. According to prevailing bearing theory, the material combination at this location would have to be soft on hard, e.g. brass/PPS. A soft/hard material combination such as the kind constituted by brass and PPS, though, is subject to very significant wear in the bearing setup given here. The fact that the bearing bush 5 is comprised of metallic material significantly reduces the axial wear at the axial contact surface 10 in comparison to plastic bearings currently in use. The stop shoulder 6 on the bearing bush 5 can be embodied extending both radially inward and radially outward. An additional increase in the hardness of the material of the bearing bush 5 can already be achieved during its manufacture by means of a cold forming process. Examples of this kind of forming process include deep drawing or extrusion. The greater the hardness of the circumference surface 7 of the bearing bush 5, the less wear occurs at the radial contact surface 11 between the bearing bush 5 and the bearing shell 19 and at the axial contact surface 10 between the end of the bearing bush 5 and the collar of the valve shaft 3. With the embodiment proposed according to the present invention, it is consequently possible, through the production of a hard/hard friction setup at both the axial contact surface 10 and the radial contact surface 11, to achieve significantly lower wear parameters, which significantly extends the service life of a throttle valve unit produced in this manner with regard to the sealing action and with regard to the leakage air flows occurring due to worn bearing surfaces. It is also possible to achieve a significant improvement in the smoothness of the valve shaft 3 and the throttle valve flap 4 formed onto it in relation to the throttle valve housing 1 or throttle valve housing section 19.

The bearing bushes 5 can be made of coated or uncoated nonferrous metals or metal alloys, plastic, or ceramic material.

The foregoing relates to preferred exemplary embodiments of the invention, it being understood that other variants and embodiments thereof are possible within the spirit and scope of the invention, the latter being defined by the appended claims.

We claim:

1. A method for manufacturing a throttle valve unit, including a throttle valve housing (1, 19) and a throttle valve (2) that can move in relation to it, the method comprising the process steps of:

a) injection molding the throttle valve housing (1, 19) out of a first plastic material inside a first area, b) inserting at least one bearing bush (5) that contains a metallic material into the throttle valve housing (1, 19), the metallic material and the first plastic material producing a friction state between two relatively hard substances between the at least one bearing bush (5) and the throttle valve housing (1, 19), c) transferring the throttle valve housing (1, 19) produced according to process steps a) and b) to a second area that is spatially separate from the first area, and d) injection molding the moving throttle valve (2) and a valve shaft (3) in the throttle valve housing (1, 19), in one piece out of a second plastic material, inside the second area.

2. The method according to claim 1, wherein the at least one bearing bush (5) is produced by means of a deep drawing or an extrusion process, or by means of material-removing machining.

3. The method according to claim 2, wherein the forming process increases the surface hardness of the circumference surface (7) of the at least one bearing bush (5).

4. The method according to claim 3, wherein a radial contact surface (11) of the at least one bearing bush (5) produces a friction state between two relatively hard materials between the throttle valve housing section (19) in the form of a bearing shell and the circumference surface (7) of the at least one bearing bush (5).

5. The method according to claim 2, wherein the geometry of the at least one bearing bush (5) on its end opposite from the stop shoulder (6), i.e. at the axial contact surface (10), is produced by means of material-removing machining, stamping, or swaging of the bearing bush (5).

6. The method according to claim 1, wherein the throttle valve housing (1) is injection molded out of polyphenylene sulfide.

7. The method according to claim 6, wherein the stop shoulder (6) is provided with a radius greater than or equal to 0.1 mm through stamping, swaging, or material-removing machining of the at least one bearing bush (5).

8. The method according to claim 1, wherein the throttle valve housing (1) or a throttle valve housing section (19) is comprised of polyamide and the throttle valve (2), which includes a valve shaft (3) and a throttle valve flap (4), is injection molded out of PPS (polyphenylene sulfide).

9. The method according to claim 1, further comprising the step of machining a circumferential surface (7) of the at least one bearing bush (5) to a quality that corresponds to a low $R_Z$ value.

10. The method according to claim 1, wherein a friction state between two relatively hard substances exists between the at least one bearing bush (5) and a collar of a valve shaft (3) at an axial contact surface (10).

11. The method according to claim 1, wherein the at least one bearing bush (5), which has been inserted into the previously molded component comprising the throttle valve housing (1) according to process step c), has a stop shoulder (6) extending radially inward or outward.

12. The method according to claim 1, wherein during process step a), the at least one bearing bush (5) is injection molded of a metallic material, into the throttle valve housing (1) or throttle valve housing section (19).

13. The method according to claim 1, wherein the at least one bearing bush (5) remains in a dimensionally stable state during process step d).

14. The method according to claim 1, wherein the at least one bearing bush (5) is manufactured from a coated or uncoated nonferrous metal.

* * * * *

UNITED STATES PATENT AND TRADEMARK OFFICE

CERTIFICATE OF CORRECTION

PATENT NO. : 7,610,677 B2
APPLICATION NO. : 11/217476
DATED : November 3, 2009
INVENTOR(S) : Lorenz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Twelfth Day of October, 2010

David J. Kappos

*Director of the United States Patent and Trademark Office*